United States Patent [19]

Mathias

[11] Patent Number: 5,135,569

[45] Date of Patent: Aug. 4, 1992

[54] INK COMPOSITION CONTAINING FLUORESCENT COMPONENT AND METHOD OF TAGGING ARTICLES THEREWITH

[75] Inventor: Eckart Mathias, Catonsville, Md.

[73] Assignee: W. R. Grace & Co.-Conn., New York, N.Y.

[21] Appl. No.: 573,087

[22] Filed: Aug. 24, 1990

[51] Int. Cl.$^5$ .............................................. C09D 11/00
[52] U.S. Cl. .......................................... 106/22; 106/19; 106/21; 252/301.16
[58] Field of Search .................... 106/19, 20, 21, 22; 252/301.16

[56] References Cited

U.S. PATENT DOCUMENTS

| | | | |
|---|---|---|---|
| 3,567,482 | 9/1971 | George et al. | 283/92 |
| 3,671,451 | 6/1972 | Butterfield | 106/21 |
| 3,886,083 | 6/1975 | Laxer | 106/21 |
| 3,892,972 | 7/1975 | Cevasco | 106/21 |
| 3,928,226 | 12/1975 | McDonough et al. | 106/21 |
| 3,960,755 | 6/1976 | Beachem et al. | 106/21 |
| 4,015,131 | 3/1977 | McDonough et al. | 106/21 |
| 4,029,506 | 6/1977 | Dessauer | 106/21 |
| 4,150,997 | 5/1979 | Hayes | 106/22 |
| 4,153,593 | 9/1979 | Zabiak et al. | 106/22 |
| 4,186,020 | 1/1980 | Wachtel | 106/21 |
| 4,212,642 | 7/1980 | Della Casa et al. | 106/22 |
| 4,243,694 | 1/1981 | Mansukhani | 106/21 |
| 4,451,530 | 3/1984 | Kaule et al. | 428/323 |
| 4,500,116 | 5/1985 | Ferro et al. | 283/92 |
| 4,610,806 | 9/1986 | Rosen | 106/21 |
| 4,627,642 | 5/1986 | Peronneau et al. | 283/92 |
| 4,736,425 | 12/1988 | Jalon | 283/92 |
| 4,889,365 | 3/1989 | Chouinard | 283/92 |
| 4,891,505 | 4/1990 | Jalon | 252/62.57 |
| 4,992,204 | 2/1991 | Kluger et al. | 252/301.16 |
| 5,084,205 | 1/1992 | Auslander | 106/22 |
| 5,091,006 | 2/1992 | Sarada et al. | 106/22 |

FOREIGN PATENT DOCUMENTS 54-013799 2/1979 Japan .

*Primary Examiner*—William R. Dixon, Jr.
*Assistant Examiner*—Helene Klemanski
*Attorney, Agent, or Firm*—Valerie E. Looper

[57] ABSTRACT

Provided is an ink composition which comprises a fluorescent dye. The ink composition is useful in tagging for subsequent identification various articles having a polymeric or porous organic or inorganic surface. The ink composition comprises a non-fluorescent ink such as a black ink, a fluorescent dye, and a solvent for the fluorescent dye, which solvent swells and impregnates the surface of the article thereby permitting impregnation of the article by the fluorescent dye. The resulting tagged article has a printed surface with a fluorescent dye impregnated within the article directly beneath the printing on the surface. Identification of the article can then take place by removing printed material, and subjecting the article to UV irradiation. Observing a bright fluorescent color characteristic of the fluorescent dye used confirms the authenticity of the article.

14 Claims, No Drawings

INK COMPOSITION CONTAINING FLUORESCENT COMPONENT AND METHOD OF TAGGING ARTICLES THEREWITH

BACKGROUND OF THE INVENTION

The present invention relates to a novel ink composition useful in tagging articles for subsequent identification. More particularly, the ink composition contains a fluorescent dye. The present invention also relates to a method of tagging articles using such a composition.

Fluorescent dyes have been used in printing for many different purposes. Among the most prominent uses is as a component in the ink for detecting an attempted fraud or for identifying an article as an original and not a counterfeit. The manner in which the fluorescent component is used to identify an article, or for security purposes in general, can vary greatly.

For example, U.S. Pat. No. 4,889,365 discloses a counterfeit resistant label for goods which is manufactured by printing a code word on the label using an ink, such as a conventional ultraviolet light sensitive ink, that is sensitive to light in the nonvisible spectrum. Japanese Patent Publication 0013799 also discloses a composition comprising colored ink containing a fluorescent material which becomes visible upon UV irradiation. In the use of either of the foregoing compositions, the ink does not have to be abraded off in order to view the fluorescent material under UV radiation.

U.S. Pat. No. 4,451,530 relates to security papers having luminescing authenticity features worked into them or printed on them. The authenticity features used involve a luminophore and one or more absorbing materials by which the emission and/or excitation spectrum of the luminophore is changed in a detectable fashion. The authenticity of the document can then be checked by observing the changed emission or excitation spectrum.

U.S. Pat. No. 4,891,505 discloses a fiduciary document chelate comprising print which is odorless and undetectable in natural or artificial light, but which fluoresces in the red spectrum when excited by UV light. Moreover, the chelate comprising print will fluoresce in the green spectrum when cooled to the temperature of liquid nitrogen. In essence, the fluorescence wavelength of the chelate comprising print is a function of temperature. U.S. Pat. No. 4,736,425 also discloses the use of a chelate in detecting and identifying a fiduciary document as an original. In the first step, one or more elements needed in forming the chelate is or are deposited on the security paper, either at the head of the papermaking machine or during the coating, or at any other stage during its manufacture or finishing. The deposit of the chelate forming element or elements does not alter the color of the paper and does not exhibit any fluorescence. When identification of the document is desired, the missing elements of the chelate is applied to the paper to synthesize the chelate. The chelate synthesized in this manner is an identification mark which is invisible in sunlight or under artificial light, but is visible owing to its fluorescent emission under excitation by ultraviolet light irradiation.

U.S. Pat. No. 3,886,083 discloses a safety ink comprising a UV fluorescent pigment. Upon alteration due to attempted eradication a change in intensity of the fluorescence becomes observable.

Additional patent publications which disclose printed matter comprising UV detectible fluorescent elements include U.S. Pat. Nos. 4,627,642 and 4,500,116. In general, other patent references which disclose fluorescent dye comprising inks include U.S. Pat. Nos. 4,243,694, 4,150,997, 4,186,020 and 4,153,593.

While many different fluorescent ink compositions and methods of using same are available for identification and security purposes, problems can still arise when a commercial black ink is to be employed in the printed matter. Such black ink does not fluoresce and will mask the fluorescence of any fluorescent component contained within the black ink. It would therefore be of a great advantage to the technology to provide a black ink composition which can be used successfully for identification and/or security purposes.

Accordingly, it is an object of the present invention to provide a novel ink composition containing a fluorescent component.

It is another object of the present invention to provide a black ink composition containing a fluorescent component, which ink composition can successfully be used for subsequent identification of tagged articles and/or for security purposes.

Still another object of the present invention is to provide an article which is tagged with such an ink composition such that subsequent identification and/or confirmation of the article is possible.

Still another object of the present invention is to provide a method of tagging articles with the novel ink composition of the present invention.

These and other objects of the present invention will become apparent upon a review of the following specification and claims appended thereto.

SUMMARY OF THE INVENTION

In accordance with the foregoing objectives, there is provided by the present invention an ink composition which comprises
  (i) a non-fluorescing ink,
  (ii) a fluorescent dye, and
  (iii) a solvent for the fluorescent dye which swells and impregnates the substrate upon which the ink composition is to be placed to thereby permit impregnation of the substrate by the fluorescent dye.

In most practical applications of the present invention, the non-fluorescing ink is a black ink.

In another embodiment of the present invention, there is provided an article tagged for subsequent identification having a surface with printed material thereon, said article comprising
  (i) a surface comprised of a polymeric or porous inorganic or organic material,
  (ii) printed material on the surface of the article wherein the printed material is comprised of a non-fluorescing ink, e.g., a black ink, and
  (iii) a fluorescent dye impregnated into said surface of the article, directly beneath the non-fluorescing ink printed material on the surface of the article.

In another embodiment of the present invention, there is provided a method for subsequent identification of such a tagged article, which method comprises the steps of
  (a) providing a tagged article comprised of
    (i) a surface comprised of a polymeric or porous or inorganic organic material,
    (ii) printed material on the surface of the article wherein the printed material is comprised of a non-fluorescing ink, e.g., a black ink, and (iii) a fluorescent dye impregnated into said surface of the article, directly beneath the non-fluorescing ink printed material on the surface of the article, (b) removing a portion of the printed material on the surface of said article, and (c) exposing the article to ultraviolet radiation to determine the fluorescence of the article in that portion of the article where the printed material has been removed.

Another embodiment of the present invention provides a method for tagging an article for subsequent identification, which method comprises (i) providing the article to be tagged, said article comprising a polymeric or porous inorganic or organic surface material, (ii) providing an ink composition comprised of a non-fluorescing ink, e.g., a black ink, a fluorescent dye and a solvent for the fluorescent dye which swells and/or impregnates the surface material of the said article, and (iii) applying the ink composition to the surface of the article to thereby allow the solvent for the fluorescent dye to swell and impregnate the surface material permitting the fluorescent dye to impregnate the surface material of said article.

Upon subsequent evaporation of the solvent for the fluorescent dye, the fluorescent dye will be left impregnated into the article.

DETAILED DESCRIPTION OF THE PREFERRED EMBODIMENTS

The non-fluorescing ink used in the ink composition of the present invention is most preferably a black ink. The present invention is also applicable, however, to other inks which suffer the same problem as black inks, i.e., the masking of the presence of any fluorescent dye in the composition so that fluorescence is not observed. The present invention is also applicable to inks which physically quench any fluorescent dye present in the composition so that fluorescence is not observed. Thus, while the present invention will be described with regard to black inks, it is believed that the scope of the present invention extends beyond simply black inks. One skilled in the art should readily be able to apply the present invention to other applicable inks. Any type of ink, e.g., a printing ink, writing ink, or ink jet ink, can be used for the purposes of the present invention.

Of the black inks useful in the practice of the present invention, any commercial black ink is suitable. The present invention permits one to employ a fluorescent dye in combination with a black ink, and avoid the problem of the black ink totally masking any effective use of the fluorescent dye. It is generally accepted that fluorescent dye doped black inks will not fluoresce when exposed to UV light. The present invention, however, circumvents this problem.

The fluorescent dye employed in the practice of the present invention can generally be any commercially available fluorescent dye. Of course, the dye must be soluble in the selected solvent and must be able to impregnate the substrate. Excellent results have been found with fluorescent dyes which fluoresce with many different colors and combinations thereof. The following Table lists several commercially available dyes as illustrations of suitable fluorescent dyes which have been found particularly useful in the practice of the present invention. Each dye is noted by its tradename, as well as its chemical composition.

TABLE 1

| DYE (COMPANY, NAME) | COLOR | CHEMICAL COMPOSITION |
| --- | --- | --- |
| Day-Glow, Fluorescent Dye Columbia Blue D-298 | Blue/ White | Sulfuric acid disodium salt mixture with 7-(diethylamino)-4-methyl-2H-1-benzopyran-2-one |
| Keystone, Rhodamine B Base | Orange/ Pink | 3',6'-bis(diethylamino)-spiro-(isobenzofuran-1 (3H),9'-(9H)xanthen)-3-one or 3',6'-bis(diethylamino)-fluoran |
| Keystone, Fluorescent Yellow FGPN | Green/ Yellow | 4-amino-N-2,4-xylyl-naphthalimide |
| Keystone, Keyfluor White RWP | Blue/ White | 7-(diethylamino)-4-methyl-coumarin |
| Keystone, Fluorescent Brill Orange 2G | Orange/ Pink | 14H-anthra[2,1,9-mna] thioxanthen-14-one |
| Keystone, Fluorescent Yellow G | Green/ Yellow | N-butyl-4-(butylamino)-naphthalimide |

Other fluorescent dyes are well known to the art, and can also be used in the practice of the present invention.

The solvent employed in the ink composition of the present invention is a specifically selected solvent. The solvent must be a solvent for the fluorescent dye, so that it dissolves the dye. From a practical standpoint, it is preferred that the solvent dissolve all of the fluorescent dye so that all of the dye is used and none is wasted. However, this is not absolutely necessary. The solvent for the fluorescent dye must also swell and penetrate the substrate upon which the ink composition is to be placed. By swelling and penetrating the substrate, the solvent permits impregnation of the substrate with the fluorescent dye, so when the solvent evaporates, the fluorescent dye is left within the interior of the substrate. In this respect, it is important that the fluorescent dye is of a molecular size small enough to permit penetration into the substrate or surface layer upon which the ink composition is placed.

The determination of the solvent employed, therefore, will vary depending upon the ultimate substrate upon which the ink composition is to be printed. Useful solvents include ketones, chlorinated hydrocarbons, aromatic hydrocarbons, organic esters and ethers, with each being more useful or less useful depending on the particular article with which the ink composition is to be used. The following Table lists examples of suitable solvents for use in the practice of the present invention, which list is not to be considered exhaustive, but only illustrative.

TABLE 2

Ketones
methyl isoamyl ketone
methyl propyl ketone
cyclohexanone
diethyl ketone
diisobutyl ketone
methyl amyl ketone
methyl isobutyl ketone
methyl n-propyl ketone
Chlorinated Hydrocarbons
monochlorobenzene
o-dichlorobenzene
perchloroethylene
1,2,4-trichlorobenzene
1,1,1-trichlorethane
dichloroethylene
trichloroethylene
Aromatic Hydrocarbons

TABLE 2-continued xylenes, including individual isomers
toluene
phenol
nitrobenzene Acetates (and other esters)

amyl acetate
iso-butylacetate
iso-butyl isobutyrate
2-ethyl hexylacetate (octyl acetate)

Ethers a variety of DOWANOL ®, CELLOSOLVE ® and
CARBITOL ® solvents
1,4-dioxane
furfural Miscellaneous dimethyl formamide
dimethyl acetamide
isophorone
2-nitropropane
triethanolamine
methyl-pyrrolidone From a practical standpoint, the determination of the solvent must also consider the extent to which the solvent swells and/or impregnates the substrate upon which the ink composition is to be placed, as well as the length of time needed to evaporate the solvent. The extent, or how effectively, the solvent swells and impregnates the substrate is very important in that the solvent should quickly swell and impregnate the substrate. If the solvent is too slow in swelling, then the solvent may evaporate before the fluorescent dye, has an opportunity to impregnate the substrate. The length of time it takes for the solvent to evaporate must therefore be carefully considered when selecting a solvent, together with the effectiveness of the solvent in swelling and impregnating the substrate. The impregnation of the solvent, however, must not go so far as to go through the article to which the ink composition is applied. Such an impregnation generally would be considered deleterious, e.g., resulting in the contamination of any contents of the article.

The evaporation rate of the solvent for the fluorescent dye should, therefore, be such so as to permit an effective impregnation of the solvent into the substrate. It is the selection and addition of the solvent which permits one to realize the advantages of the present invention. Generally, the solvent used in the black ink is designed for fast drying (evaporation) to allow for fast printing. Hence, the original solvent in the ink would normally not allow sufficient time for the dye to impregnate sufficiently into the substrate. Furthermore, some inks have almost no solvent content. Therefore, the specifically selected solvent of the present invention used in conjunction with the fluorescent dye permits for sufficient time for the dye to impregnate into the substrate while the solvent in the black ink is evaporated at the ink manufacturer's desired rate. Ultimately, the solvent for the fluorescent dye also evaporates off. By adding the fluorescent dye solvent in very small amounts, the rate of printing is not significantly affected.

It is also important that the solvent for the fluorescent dye be compatible with the black ink. Mutual compatibility permits easy application, with uniform and effective results.

The amount of fluorescent dye employed in the ink composition can vary greatly. The upper limit is essentially the saturation point of the fluorescent dye within the solvent. In general, the amount of fluorescent dye employed preferably ranges from about 0.01% to about 15% by weight of the entire ink composition (including non-fluorescing ink, fluorescent dye and solvent for the fluorescent dye), with the amount of fluorescent dye more preferably ranging from about 0.1 to about 10% by weight, and most preferably from about 1.0% to about 7% by weight. The amount of fluorescent dye solvent employed in the ink composition can also vary greatly and is determined by practical considerations. Generally, however, the amount of fluorescent dye solvent employed in the ink composition is preferably at least about 3% by weight, and ranges more preferably from about 5% to about 15% by weight, and most preferably from about 6% to about 10% by weight of the entire ink composition.

In order to tag an article in accordance with the present invention, one must first provide the article to be tagged, which article has a surface comprised of a polymeric or porous organic or inorganic material. It is this surface which is the substrate upon which the ink composition is applied. The material of which the surface is comprised can be any polymeric material, or a porous inorganic or organic material such as clay or leather. Among suitable polymeric materials, polyvinylchloride is the most preferred, with polyvinylalcohol, polystyrene and polyester films being other suitable polymeric materials.

The solvent of the ink composition is selected based upon the composition of the surface to which the ink composition is to be applied. For polyvinylalcohol, for example, water would be a very suitable solvent. Similarly, water would be a suitable solvent for leather. For polystyrene, diethylketone or toluene, or a mixture thereof would be a suitable solvent. For a polyester material, dimethylformamide, a phenol or cresol would be a suitable solvent. For polyvinylchloride, the most preferred solvents are ketones. Diethylketone is the most preferred solvent for use with a polyvinylchloride substrate. A mixture of diethylketone and methylethylketone can also be used when faster drying is desired. The methylethylketone generally evaporates too fast to permit use alone, but a mixture of the two permits penetration due to the presence of the diethylketone. The diethylketone can also be mixed with a ketone such as cyclohexanone, a hydrocarbon such as toluene, or a chlorinated solvent such as chloroform or 1,1,1-trichloroethane. Or, any of the foregoing solvents can be used alone with a suitable substrate.

Once the article is selected and an appropriate ink composition is provided, the ink composition is then applied to the surface of the article to thereby allow the solvent for the fluorescent dye to swell and impregnate the material of the surface permitting the fluorescent dye to impregnate the article. Upon evaporation of the solvent, a tagged article for subsequent identification is obtained.

The tagged article is therefore comprised of printed material on its surface, which printed material is comprised of the non-fluorescing black ink contained in the ink composition applied. The placement of the ink composition on the surface of the article is generally achieved by a printing procedure. The printing procedure can be, for example, by pad printing, screen printing, gravure printing, offset lithographic printing, letterpress printing, flexographic printing, letterset printing, or ink jet printing. Due to the swelling and impregnation of the article by the solvent for the fluorescent dye, the non-fluorescing black ink remains on the surface to provide the printed design. Upon evaporation of the solvent, the fluorescent dye remains impregnated within the surface of the article, directly beneath the non-fluorescing black ink on the surface of the article.

The method used for identifying a tagged article, i.e., thereby identifying or confirming the existence of an original article, involves a removal of the black ink printed material on the surface of the article. This physical removal is generally best achieved by physical abrasion, e.g., erasure of the pad printed ink, a razor blade for scraping the material printed with an ink jet ink, sandpaper, or some other suitable abrasive. Other means of removing the ink can be used where appropriate. The portion of the article from which the printed material has been removed can then be viewed while being exposed to ultraviolet radiation, e.g., a black light. The ultraviolet radiation can be of a short or longer wavelength, e.g., about 254 nanometers or 365 nanometers. Or, a mixture of wavelengths can be used. Generally, the wavelength of ultraviolet radiation selected is based upon the fluorescent dye expected to be viewed. When the dye is present, confirming it as a tagged article, the printed message is seen in a bright fluorescent color characteristic of the dye used. Because the black ink has been removed, the fluorescent dye directly underneath the black ink fluoresces to provide the printed message in its characteristic fluorescent color.

Such tagging technique is most successfully used in the identification of an article as coming from a particular source. For instance, a vial/container made of polyvinylchloride can be printed with an ink composition containing a black ink, a fluorescent dye and a ketone solvent such as diethylketone. Abrading a portion or all of the printed message and then subjecting the vial/container to UV irradiation would result in the printed message being observed in the fluorescent color characteristic of the fluorescent dye. Such fluorescence would confirm that the product, and its contents, came from a particular source and it is not a counterfeit or forged vial/container.

The ink composition and methods of the present invention can also be used on other articles and in other applications. For example, the present invention can be applied to the printing of "intelligence" information, e.g., in memos, microfilms and coded messages. The labeling or bar coding of products, either directly onto containers or by way of plastic or paper labels is another application of the present invention. Replacement of "water marks" on sensitive documents, e.g., contract papers, wills and currency paper can be achieved effectively and easily with the present invention. The coating of telecommunications lines, e.g., wires and optical fibers, is another application. The inks of the present invention can also be used in handheld "security" writing pens to identify authentic documents. Other applications will also be readily apparent.

In order to further illustrate the practice of the present invention and the advantages thereof, the following examples are provided. However, these examples are in no way meant to be limiting, but merely illustrative.

EXAMPLE 1

To 6.234 g of MARKEM ® Ink 7410 Black was added 0.635 g of a dye solution consisting of 0.189 g DAY-GLO ® Columbia Blue D-298 dye and 0.446 g of cyclohexanone. The mixture was mixed well and then applied to the surface of a vial made of polyvinylchloride using a rubber stamp.

After curing the ink at room temperature for at least two minutes, the ink was rubbed off with a bar of dry LAVA soap. Rough paper towel or an eraser would also work. Excess soap was then wiped off, and inspection of the abraded portion under a "black light" showed a bright blue/white fluorescence at the exact location of the original printing.

EXAMPLE 2

To 3.12 g of WILLETT Jet Ink (a black ink) was added 0.21 g of diethylketone (DEK) and 0.09 g of DAY-GLO Columbia Blue D-298. After shaking, a portion of the sample was applied onto a polyvinylchloride vial using a birch stick. The ink was allowed to cure at room temperature for at least one minute, and was then scraped off using a single edge razor blade. This scraped portion was then inspected under the "black light" with the same result as in Example 1.

EXAMPLE 3

The procedure of Example 2 was repeated five times, with a different dye being used each time. The dyes used in the five runs were:
KEYSTONE, Rhodamine B Base
KEYSTONE, Fluorescent Yellow FGPN
KEYSTONE, Keyfluor White RWP
KEYSTONE, Fluorescent Brill Orange 2G
KEYSTONE, Fluorescent Yellow G Each of the foregoing runs resulted in a bright colored fluorescent message characteristic of the dye used, which message was in the exact location of the original printing.

While the invention has been described with preferred embodiments, it is to be understood that variations and modifications may be resorted to as will be apparent to those skilled in the art. Such variations and modifications are to be considered within the purview and the scope of the claims appended hereto.

I claim:
1. An ink composition which comprises
   (i) a fluorescent dye;
   (ii) a non-fluorescing ink which masks the presence of the fluorescent dye so that fluorescence is not observed;
   (iii) a solvent for the fluorescent dye which permits the fluorescent dye to impregnate the surface of a substrate, while allowing the non-fluorescing ink to remain substantially on the surface of the substrate.
2. The ink composition of claim 1, wherein said non-fluorescing ink is a black ink.
3. The ink composition of claim 2, wherein the solvent comprises a mixture of ketones.
4. The ink composition of claim 2, wherein the solvent comprises diethylketone.
5. The ink composition of claim 1, wherein the fluorescent dye fluoresces with a blue/white, orange or green color.
6. The ink composition of claim 1, wherein the solvent comprises a ketone, chlorinated hydrocarbon, aromatic hydrocarbon, an ester or an ether.
7. The ink composition of claim 1, wherein the solvent comprises a ketone.
8. The ink composition of claim 1, wherein the solvent comprises diethylketone.

9. The ink composition of claim 1, wherein the solvent for the fluorescent dye comprises a mixture of solvents.

10. The ink composition of claim 1 wherein the fluorescent dye is a sulfuric acid disodium salt mixture with 7-(diethylamino)-4-methyl-2H-1-benzopyran-2-one; 3',6'-bis(diethylamino)spiro(isobenzofuran-1(3H)-9'-(9H)xanthen)-3-one; 4-amino-N-2,4-xylyl-naphthalimide; 7-(diethylamino)-4-methyl-coumarin; 14H-anthra[2,1,9-mna]thioxanthen-14-one; or, N-butyl-4-(butylamino)-naphthalimide.

11. The ink composition of claim 1, wherein the amount of fluorescent dye ranges from about 0.01% to about 15% by weight.

12. The ink composition of claim 1, wherein the amount of fluorescent dye ranges from about 1.0% to about 7% by weight.

13. The ink composition of claim 1, wherein the amount of solvent for fluorescent dye present ranges from about 5 to about 15% by weight.

14. The ink composition of claim 1 wherein the amount of fluorescent dye is about 0.01% to 15% by weight and the amount of solvent for the fluorescent dye is about 5 to 15% by weight.

* * * * *